(12) United States Patent
Takeda et al.

(10) Patent No.: US 9,723,603 B2
(45) Date of Patent: Aug. 1, 2017

(54) RADIO BASE STATION APPARATUS, USER TERMINAL AND RADIO COMMUNICATION METHOD

(75) Inventors: Kazuaki Takeda, Tokyo (JP); Daisuke Nishikawa, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 152 days.

(21) Appl. No.: 13/977,448

(22) PCT Filed: Dec. 22, 2011

(86) PCT No.: PCT/JP2011/079766
§ 371 (c)(1),
(2), (4) Date: Sep. 10, 2013

(87) PCT Pub. No.: WO2012/093594
PCT Pub. Date: Jul. 12, 2012

(65) Prior Publication Data
US 2013/0343313 A1    Dec. 26, 2013

(30) Foreign Application Priority Data
Jan. 7, 2011  (JP) ................. 2011-002486

(51) Int. Cl.
*H04L 5/00* (2006.01)
*H04W 72/04* (2009.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
CPC ............... H04W 72/042; H04L 5/0053; H04L 27/2602; H04L 27/042
See application file for complete search history.

(56) References Cited

U.S. PATENT DOCUMENTS

| | | | |
|---|---|---|---|
| 8,189,615 B2 | 5/2012 | Malkamaki et al. | |
| 2010/0254329 A1* | 10/2010 | Pan et al. | 370/329 |

(Continued)

FOREIGN PATENT DOCUMENTS

| | | |
|---|---|---|
| CN | 101478808 A | 7/2009 |
| CN | 101808408 A | 8/2010 |

(Continued)

OTHER PUBLICATIONS

CATT: 3GPP TSG RAN WG1 Meeting #61, R1-102661, Montreal, Canada, May 10-14, 2010.*
(Continued)

*Primary Examiner* — Michael Thier
*Assistant Examiner* — Zhensheng Zhang
(74) *Attorney, Agent, or Firm* — Osha Liang LLP

(57) ABSTRACT

In order to prevent any increase in number of blind detections and make efficient use of radio resources even when a format of downlink control information is changed in accordance with a communication environment, the present invention provides a radio communication method for generating control information by using a predetermined DCI format out of a plurality of DCI formats including a first DCI format having an uplink scheduling grant and a second DCI format having downlink scheduling assignment. When the first DCI format is extended in size, the second DCI format is added with an information field so as to have the same size as the extended first DCI format, and information to extend an existing function of the second DCI format and/or information to add a new function is added to the information field thereby to generate the control information.

5 Claims, 16 Drawing Sheets

(51) Int. Cl.
*H04L 27/26* (2006.01)
*H04W 28/06* (2009.01)

(52) U.S. Cl.
CPC ........ *H04L 5/0091* (2013.01); *H04L 27/2602* (2013.01); *H04W 28/06* (2013.01)

(56) References Cited

U.S. PATENT DOCUMENTS

| | | | | |
|---|---|---|---|---|
| 2011/0085458 | A1* | 4/2011 | Montojo | H04L 1/0038 370/252 |
| 2013/0028134 | A1 | 1/2013 | Wang et al. | |
| 2013/0294400 | A1* | 11/2013 | Liu | H04L 5/001 370/330 |

FOREIGN PATENT DOCUMENTS

| | | | |
|---|---|---|---|
| CN | 101827444 A | 9/2010 | |
| JP | 07-312600 A | 11/1995 | |
| JP | 2008-526067 A | 7/2008 | |
| WO | 2010/093006 A1 | 8/2010 | |

OTHER PUBLICATIONS

3GPP_1: 3GPP Technical Specification 36.212 V10.0.0 (Dec. 2010).*
Ericsson: TSG-RAN WG1 #62bis, R1-105333, Xian, China Oct. 11-15, 2010.*
W. Xiao, Uplink Power Control, Interference Coordination and Resource Allocation for 3GPP E-UTRA, IEEE Vehicular Technology Conference, 2006, fall.*
Samsung (Resource Allocation for Dynamic SRS Activation and SRS Multiplexing, 3GPP TSG RAN WG1 #60, R1-102215, Apr. 2010).*
Texas, (Texas Instruments, 3GPP TSG RAN WG1 #61bis, Outstanding issues on dynamic aperiodic SRS, R1-103711, Jul. 2010).*
Decision to Grant a patent issued in corresponding Japanese Application No. 2011-002486, mailed Jul. 24, 2013 (4 pages).
3GPP TS 36.212 V10.0.0, "3rd Generation Partnership Project; Technical Specification Group Radio Access Network; Evolved Universal Terrestrial Radio Access (E-UTRA); Multiplexing and channel coding (Release 10)," Dec. 2010, pp. 51-67 (18 pages).
3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," Sep. 2006 (57 pages).
3GPP TS 36.212 V9.3.0, "3rd Generation Partnership Project; Technical Specification Group Radio Access Network; Evolved Universal Terrestrial Radio Access (E-UTRA); Multiplexing and channel coding (Release 9)," Sep. 2010 (61 pages).
International Search Report issued in PCT/JP2011/079766, mailed Feb. 7, 2012 (2 pages).
Office Action issued in corresponding Chinese Application No. 201180064282.6, mailed Feb. 1, 2016 (8 pages).
Office Action issued in corresponding Korean Application No. 10-2013-7017565, mailed Nov. 26, 2014 (4 pages).
ZTE; "On dynamic aperiodic SRS in LTE-A"; 3GPP TSG-RAN WG1#62, R1-104676; Madrid, Spain; Aug. 23-27, 2010 (4 pages).
Office Action issued in the counterpart Canadian Patent Application No. 2824629, mailed May 18, 2016 (4 pages).
Dahlman et al.; "3G radio access evolution—HSPA and LTE for mobile broadband"; Second Edition; Academy Press; 2008; pp. 348-351 (2 pages).
Office Action issued in corresponding Chinese Patent Application No. 201180064282.6 issued Oct. 8, 2016 (with translation) (23 pages).
Office Action dated Apr. 18, 2017, in corresponding Canadian Patent Application No. 2,824,629 (5 pages).

* cited by examiner

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

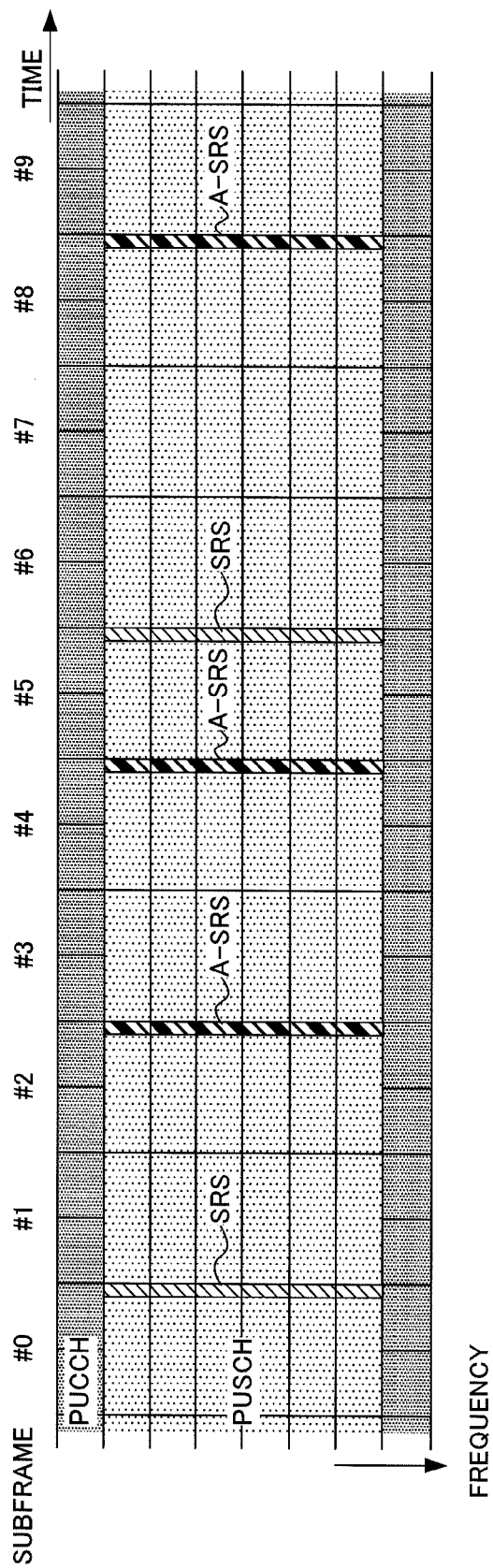

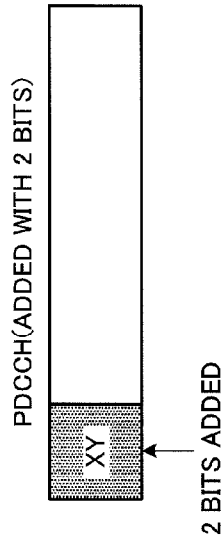

FIG. 11A

| INFORMATION FIELD | SRS TRANSMISSION DESCRIPTION |
|---|---|
| 00 | NO A-SRS IS TRANSMITTED |
| 01 | A-SRS IS TRANSMITTED (SRS TRANSMISSION PARAMETER #1) |
| 10 | A-SRS IS TRANSMITTED (SRS TRANSMISSION PARAMETER #2) |
| 11 | A-SRS IS TRANSMITTED (SRS TRANSMISSION PARAMETER #3) |

FIG. 11B

| INFORMATION FIELD | SRS TRANSMISSION DESCRIPTION |
|---|---|
| 00 | NO A-SRS IS TRANSMITTED |
| 01 | A-SRS IS TRANSMITTED (SRS TRANSMISSION PARAMETER #0, CC#1) |
| 10 | A-SRS IS TRANSMITTED (SRS TRANSMISSION PARAMETER #0, CC#2) |
| 11 | A-SRS IS TRANSMITTED (SRS TRANSMISSION PARAMETER #0, CC#3) |

FIG. 11C

| INFORMATION FIELD | SRS TRANSMISSION DESCRIPTION |
|---|---|
| 00 | NO A-SRS IS TRANSMITTED |
| 01 | A-SRS IS TRANSMITTED (SRS TRANSMISSION PARAMETER #0, TPC COMMAND=-1dB) |
| 10 | A-SRS IS TRANSMITTED (SRS TRANSMISSION PARAMETER #0, TPC COMMAND=0dB) |
| 11 | A-SRS IS TRANSMITTED (SRS TRANSMISSION PARAMETER #0, TPC COMMAND=1dB) |

RADIO BASE STATION APPARATUS, USER TERMINAL AND RADIO COMMUNICATION METHOD

TECHNICAL FIELD

The present invention relates to a radio base station apparatus, a user terminal and a radio communication method in a next-generation radio communication system.

BACKGROUND ART

In a UMTS (Universal Mobile Telecommunications System) network, for the purposes of further increasing data rates, providing low delay and so on, long-term evolution (LTE) has been under study (see Non Patent Literature 1). In LTE, as multi access schemes, an OFDMA (Orthogonal Frequency Division Multiple Access) based scheme is used in the downlink and an SC-FDMA (Single Carrier Frequency Division Multiple Access) based scheme is used in the uplink.

In the LTE system, signals to be transmitted on the uplink are mapped to appropriate radio resources and transmitted from a user terminal to a radio base station apparatus. In this case, user data is assigned to a PUSCH (Physical Uplink Shared CHannel). As for control information, when it is transmitted together with user data, it is assigned to the PUSCH and when it is transmitted alone, it is assigned to a PUCCH (Physical Uplink Control CHannel). The control information to be transmitted on this uplink includes a retransmission response signal (ACK/NACK) for a PDSCH (Physical Downlink Shared CHannel) signal, a scheduling request, channel state information (CSI) and so on. The CSI includes channel quality information (CQI), precoding matrix indicator (PMI) and rank indicator (RI) information.

The channel state information (reporting) is such as reports CQI/PMI/RI and is performed periodically or aperiodically. Triggering of aperiodic channel state information (Aperiodic CQI/PMI/RI Reporting) to give a transmission opportunity (trigger) with any timing is included in an uplink scheduling grant (DCI format 0). Therefore, the user terminal performs aperiodic reporting of CSI (CQI/PMI/RI) (hereinafter referred to as "A-CSI") using the PUSCH.

And, in the downlink, the user data is assigned to a PDSCH and control information is assigned to a PDCCH (Physical Downlink Control CHannel). Downlink control information (DCI) to be transmitted via the PDCCH is classified into a plurality of DCI formats in accordance with the application use and DCI message size (DCI format size). The radio base station apparatus generates downlink control information using a predetermined DCI format in accordance with a communication environment and transmits it to the user terminal.

In the LTE system (Rel-8), there are supported DCI format 0 including an uplink scheduling grant to transmit a PUSCH signal, DCI formats 1/1A to 1D/2/2A/2B including downlink scheduling assignment, and so on (e.g., see Non Patent Literature 2).

The uplink scheduling grant includes uplink shared channel (PUSCH) resource indication, transport format, HARQ (Hybrid Automatic Repeat reQuest) related information and so on. The downlink scheduling assignment includes downlink shared channel (PDSCH) resource indication, transport format, HARQ information, control information regarding spatial multiplexing (where available) and so on. And, the uplink scheduling grant also includes a power control command for PUSCH.

CITATION LIST

Non Patent Literature

Non-Patent Literature 1: 3GPP, TR25.912 (V7.1.0) "Feasibility study for Evolved UTRA and UTRAN", September 2006

Non-Patent Literature 2: 3GPP, TR36.212 (V9.3.0), "Multiplexing and channel coding", November 2010

SUMMARY OF INVENTION

Technical Problem

By the way, in 3GPP, for the purpose of achieving further broadbandization and higher speed, successor systems to LTE (Rel-8) have been under study (for example, LTE Advanced (LTE-A)).

In the LTE-A system (Rel-10), aiming to further improve spectrum efficiency and peak throughput, it has been studied to allocate a broader frequency band as compared with the LTE. For example, in LTE-A, one of requirements is to have backward compatibility with LTE and it has been studied to adopt a transmission band having a plurality of fundamental frequency blocks (CCs: Component Carriers), each fundamental frequency block being of a bandwidth usable in LTE.

In this case, if the above-described aperiodic channel state reporting is performed, it is preferable that a CSI corresponding to a predetermined one out of a plurality of downlink CCs is selected and transmitted instead of reporting A-CSI for each of all CCs. Accordingly, in addition to the trigger of A-CSI, bit information to select a predetermined CC is considered to be added to the DCI format 0.

Besides, in the LTE-A supporting the uplink multi antenna transmission, there is supposed to be increase in frequency and necessity of uplink channel quality measurement reference signals (SRS: Sounding Reference Signal). Therefore, it has been studied to adopt, in addition to periodic SRS adopted in LTE (Rel-8), aperiodic SRS (hereinafter referred to as "A-SRS") to give a transmission opportunity (trigger) with any timing. As to whether or not to transmit an A-SRS, it is selectable by the radio base station apparatus per user terminal and it has been under study to add 1 bit to the uplink scheduling grant (for example, DCI format 0/4) as an A-SRS trigger.

In this way, in the LTE-A system (Rel-10), it is considered to change the DCI format size of the uplink scheduling grant (DCI format 0/4) in accordance with the change in communication environment as described above.

In the meantime, a user terminal having received a PDCCH signal performs detection of each DCI format by the DCI format size. The user terminal can check a plurality of DCI formats simultaneously by one blind decoding if the DCI formats are equal in size. Therefore, when the predetermined DCI format size is changed in accordance with the communication environment, the number of blind detections may be increased problematically.

The present invention was carried out in view of the foregoing and aims to provide a radio base station apparatus, a user terminal and a radio communication method capable of preventing increase in number of blind detections and making effective use of radio resources even when the size of a predetermined DCI format is changed in accordance with a communication environment.

Solution to Problem

The present invention provides a radio base station apparatus radio base station apparatus comprising: a control information generating section configured to generate control information by using a predetermined DCI format out of a plurality of DCI formats including a first DCI format having an uplink scheduling grant and a second DCI format having downlink scheduling assignment; and a transmitting section configured to report the control information to a user terminal via a downlink control channel, wherein, when the first DCI format is extended in size, the control information generating section adds an information field to the second DCI format so as to make the second DCI format equal in size to the first DCI format extended and adds information to extend an existing function of the second DCI format and/or information to add a new function to the information field thereby to generate the control information.

The present invention further provides a user terminal comprising: a receiving section configured to receive downlink control information transmitted form a radio base station apparatus on a downlink control channel; and a control information demodulating section configured to demodulate the downlink control information received, wherein the control information demodulating section detects, by one time of blind decoding, a first DCI format having an uplink scheduling grant which is extended in size in accordance with a change in communication environment and a second DCI format having downlink scheduling assignment which is added with an information field so as to be equal in size to the first DCI format extended.

The present invention further provides a radio communication method for transmitting, from a radio base station apparatus to a user terminal, control information generated using a predetermined DCI format selected from a plurality of DCI formats including a first DCI format having an uplink scheduling grant and a second DCI format having downlink scheduling assignment, the radio communication method comprising the steps of: when the first DCI format is extended in size in accordance with a change in communication environment, the radio base station apparatus adding an information field to the second DCI format to make the second DCI format equal in size to the first DCI format extended, and adding information to extend an existing function of the second DCI format and/or information to add a new function to the information field thereby to generate the control information.

Technical Advantageous of Invention

According to the present invention, it is possible to prevent increase in number of blind detections and make efficient use of radio resources, even when the size of a predetermined DCI format is changed in accordance with a communication environment.

BRIEF DESCRIPTION OF DRAWINGS

FIG. 4 provides diagrams illustrating an example of a method of transmitting an A-SRS;

FIG. 11 provides diagrams illustrating 2-bit information about presence or absence of SRS trigger that is included in downlink scheduling assignment;

DESCRIPTION OF EMBODIMENTS

Figures 1A, 1B:
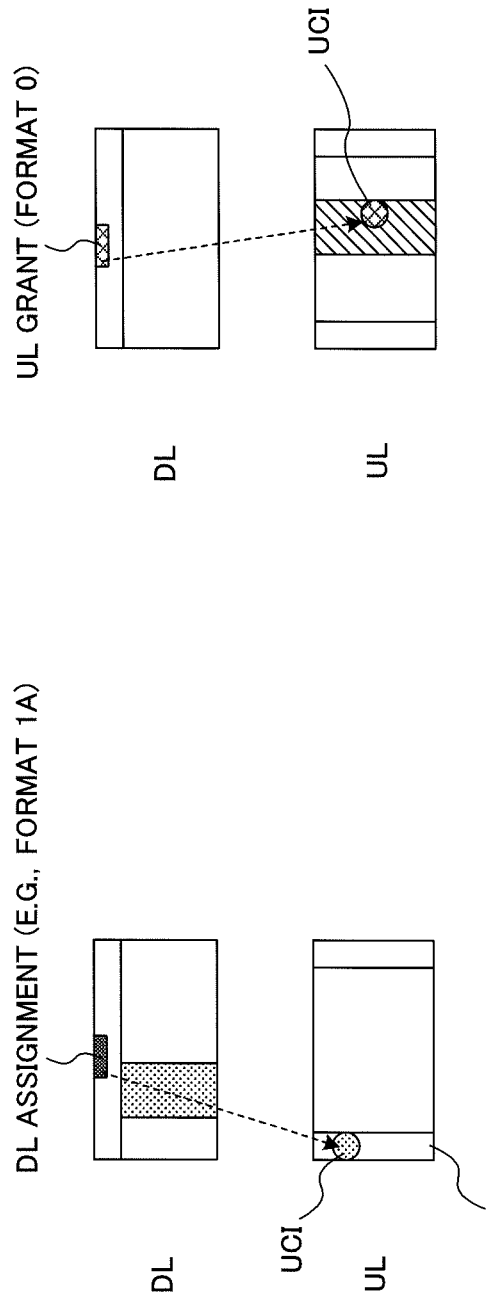
FIG. 1 provides diagrams illustrating an example of a method of transmitting uplink control information in the LTE (Rel-8) system.

FIG. 1 illustrates an example of a method of transmitting uplink control information in the LTE (Rel-8) system. As described above, the uplink control information (UCI) is transmitted via an uplink control channel (PUCCH) (see FIG. 1A).

On the other hand, when a message is transmitted in uplink scheduling grant (DCI format 0), the uplink control information is transmitted, with user data, in an uplink shared channel (PUSCH) (see FIG. 1B). For example, as for A-CSI, A-CSI trigger is included in the uplink scheduling grant (DCI format 0) and A-CSI is transmitted via the PUSCH.

Figure 2A:
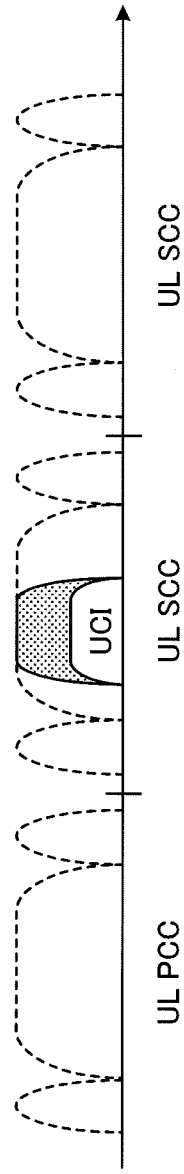
FIG. 2 provides diagrams illustrating an example of a method of transmitting uplink control information in the LTE-A (Rel-10) system.
Figure 2B:
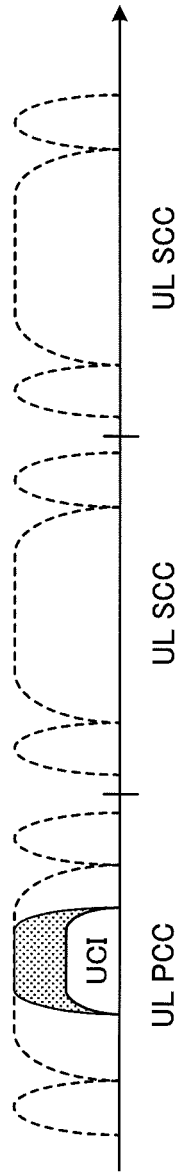

FIG. 2 illustrates an example of a method of transmitting uplink control information in the LTE-A (Rel-10) system. LTE-A adopts a system configuration having a plurality of fundamental frequency blocks (CCs). In the meantime, in uplink transmission of the LTE-A system, application of a radio access scheme of SC-FDMA has been under study. Therefore, the uplink transmission is also preferably made from a single CC in order to keep the feature of uplink single carrier transmission.

When uplink transmission is performed with a single CC, it is necessary to select a specific fundamental frequency block to transmit the uplink control information. For example, when the uplink control information is transmitted in the uplink control channel (PUCCH), it is transmitted in a PCC (Primary Component Carrier). On the other hand, when it is transmitted in the PUSCH together with user data, it is transmitted in a predetermined CC. For example, it has been studied that if A-CSI is triggered, transmission is made by selecting a CC designated by the uplink scheduling grant (see FIG. 2A), and if A-CSI is not triggered, transmission is made by selecting a predetermined CC (for example, PCC) (see FIG. 2B).

Further, where a system is configured of a plurality of fundamental frequency blocks, aperiodic channel state information (A-CSI) is preferably made by selecting a CSI corresponding to a predetermined downlink CC from a plurality of downlink CCs as described above. In this case, there is considered a method of, in addition to the A-CSI triggering, adding bit information to select a predetermined CC to the DCI format 0/4. For example, it has been considered to add 1-bit information to designate a predetermined CC to an existing 1-bit A-CSI trigger field (joint coding) (see FIG. 3).

Figure 3:
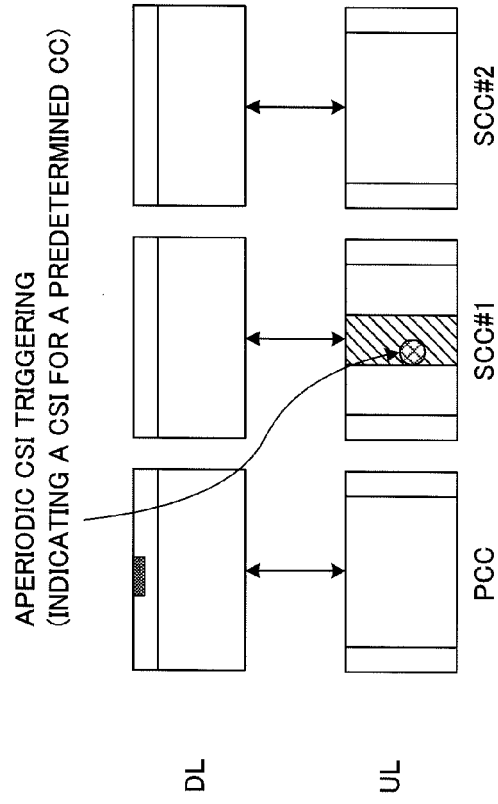
FIG. 3 is a diagram illustrating a mapping table when information regarding presence or absence of A-CSI trigger and information regarding a CC instruction corresponding to a predetermined CSI are subjected to joint coding in the UL scheduling grant.

In the example illustrated in FIG. 3, when 2-bit data to input to the A-CSI trigger field is "00", it means that "no A-CSI is transmitted", when the 2-bit data is "01", it means that A-CSI is transmitted for a DL CC associated with the system information and an uplink CC to transmit CSI", when the 2-bit data is "10", it means that A-CSI is transmitted to a set 1 composed of a single or a plurality of DL CCs reported in advance to UE by higher layer signals", and when the 2-bit data is "11", it means that A-CSI is transmitted to a set 2 composed of a single or a plurality of DL CCs reported in advance to UE by higher layer signals". In this case, the DCI size of the uplink scheduling grant (DCI format 0/4) is considered to be changed (added with 1 bit).

FIG. 4 provides diagrams for explaining a method of transmitting an A-SRS. The A-SRS is an SRS which is transmitted aperiodically by a user terminal by triggering of higher layer signaling (for example, DCI format 0). In LTE-A, as a radio base station apparatus estimates a state of an uplink channel of each of antennas of the user terminal, A-SRS is used in view of efficient transmission of SRSs. The A-SRS is multiplexed to the last SC-FDMA symbol of a subframe like a periodic SRS. And, The A-SRS and SRS may be applied together. FIG. 4A illustrates the case where A-SRSs are multiplexed to the last symbols of the subframes #2, #4 and #8 and SRSs are multiplexed to the last symbols of the subframes #0 and #5 in a transmission cycle of 4 msec.

FIG. 4B illustrates a mapping table when 1-bit information about SRS triggering is included in the UL scheduling grant (DCI format 0). When A-SRS is triggered, a 1-bit information field is added to the DCI format 0 and bit data indicative of an SRS transmission description is arranged in the added information field. In the example illustrated in FIG. 4B, when 1-bit data to input to the added information field is "0", it means that "no SRS is transmitted", and when the 1-bit data is "1", it means that "A-SRS is transmitted". In this case, the DCI size of the uplink scheduling grant (DCI format 0/4) is considered to be changed (added with 1 bit).

Figure 5A:
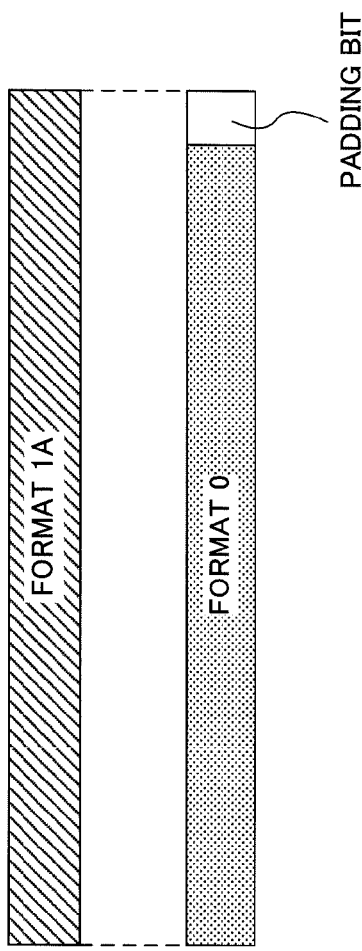
FIG. 5 provides conceptual diagrams illustrating addition of an information field to the DCI format.

In this way, in the LTE-A (Rel-10) system, it is considered to extend the size of the DCI format including the uplink scheduling grant in accordance with a communication situation. And, as described above, a user terminal having received a PDCCH signal detects each DCI format by the size of the DCI format. The user terminal is able to check a plurality of DCI formats simultaneously by one blind decoding if the DCI formats are equal in size. Therefore, in the LTE (Rel-8) system, a padding bit for adjustment is added to the DCI format 0 so as to have the same size as the DCI format 1A (see FIG. 5A).

Figure 5B:
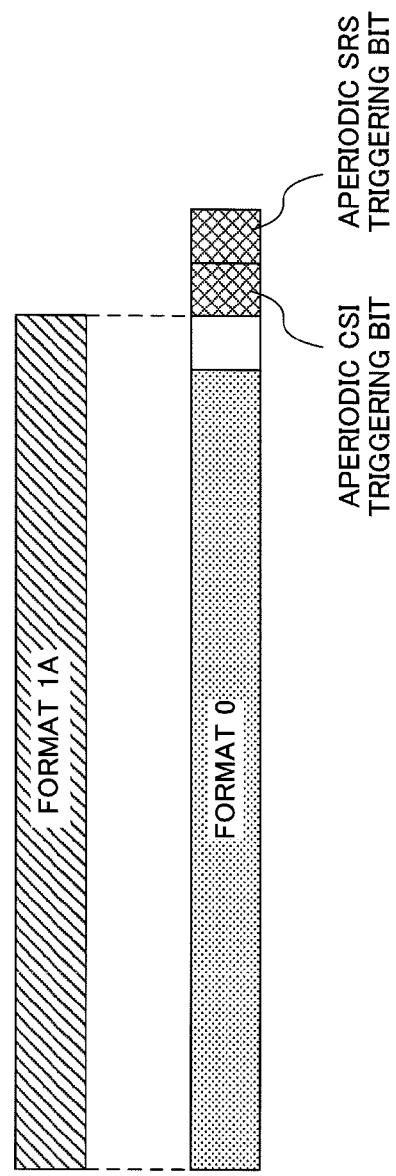

Accordingly, as described above, in the LTE-A (Rel-10) system, when bits of the DCI format 0 are increased in accordance with the change in communication environment, the DCI format 0 becomes different in size from the DCI format 1A, which may causes a problem of increase in number of blind detections (see FIG. 5B).

Figure 6:
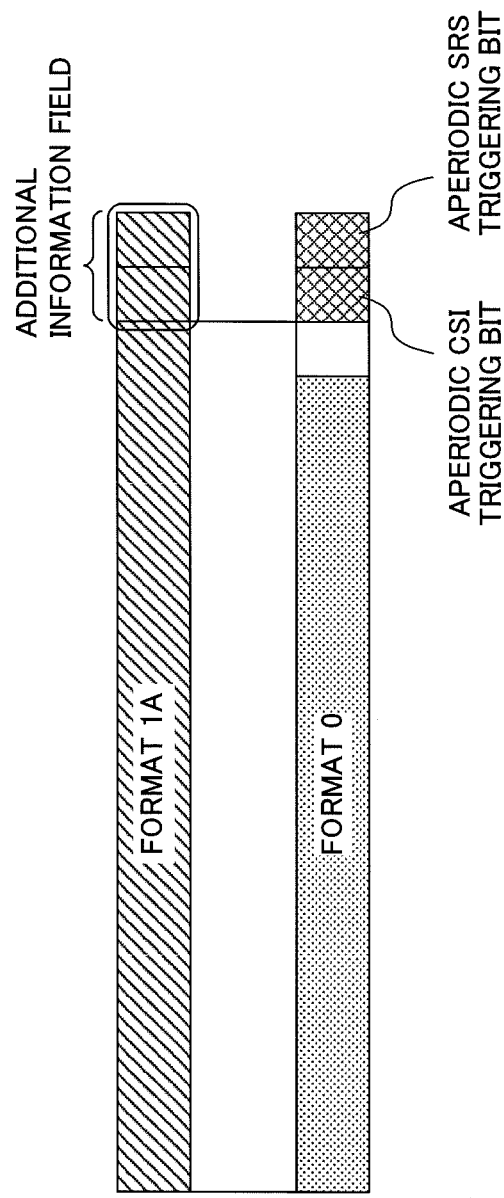
FIG. 6 provides a conceptual diagram illustrating addition of an information field to the DCI format.

The present inventors have found an idea that when a first DCI format (for example, DCI format 0) including an uplink scheduling grant is increased in size in accordance with the change in communication environment, information bit is added to a second DCI format (for example, DCI format 1A) including downlink scheduling assignment so that the both of the DCI formats can be the same in size. And, the present inventors have also found that instead of adding a padding bit for adjustment, proper downlink control information is added to the second DCI format thereby to allow extension of existing functions and/or addition of new functions (see FIG. 6).

For example, when the size of the DCI format 0 is extended in accordance with the communication environment, an information field is added to the DCI format 1A so that the DCI format 1A becomes the same in size as the extended DCI format 0. Then, information to extend existing functions of the DCI format 1A and/or information to add new functions is added to the information field added to the DCI format 1A thereby to be downlink control information.

With this structure, even when the DCI format 0 is increased in DCI size in accordance with the communication environment, it is possible to make the DCI format 0 and the DCI format 1A equal in size, thereby it is possible to prevent any increase in number of blind detections. And, as the information to extend the existing functions of the DCI format 1A and/or information to add new functions is configured to be added, instead of any adjustment bit, to the DCI format 1A, it is possible to make efficient use of radio resources.

Next description is made about an example of information to add to the information field added to the second DCI format having downlink scheduling assignment when the first DCI format having an uplink scheduling grant is increased in size in accordance with the communication environment.

In the following description, it is assumed that a 1-bit or 2-bit information field is added to the second DCI format. However, the number of bits added is by no means limiting, and it may be determined as appropriate in accordance with extension in size of the first DCI format. And, in the following description, change in communication environment is represented by the case of reporting of control information using a plurality of fundamental frequency blocks to a user terminal and the case of setting an aperiodic reference signal for uplink channel quality measurement, however, the change in communication environment is by no means limited to them.

Besides, in the following description, the DCI format 0 having an uplink scheduling grant and the DCI format 1A having downlink scheduling assignment are given as examples, but these are not intended to limit the present invention. The present invention may be configured to, when the second DCI format having downlink scheduling assignment is increased in size in accordance with the communication environment, add an information field to extend existing functions and/or to add new functions to the first DCI format having an uplink scheduling grant so that the first DCI format and the second DCI format can be equal in size.

<Extension of DAI Field>

As a duplex scheme to apply to the LTE system, there are FDD (Frequency Division Duplexing) scheme and TDD (Time Division Duplexing) scheme. The FDD scheme is such that uplink communication and downlink communication use mutually different frequencies (pair band) and the TDD scheme is such that uplink communication and downlink communication use the same frequency but are separated from each other in time.

In the FDD scheme, a radio frame of 10 ms is divided into 10 subframes. And, 1 subframe has two slots and each slot has a length of 0.5 ms. On the other hand, in the TDD scheme, each radio frame of 10 ms has two half frames of 5 ms. And each half frame includes one special subframe and four general subframes of 1 ms in length.

In the TDD scheme, the uplink/downlink time ratio is not limited to 1:1, but, the uplink/downlink subframe assignment ratio may be adjusted in accordance with an application use. In the TDD scheme of the LTE system, there are defined frame configurations corresponding to seven different asymmetric uplink/downlink subframe assignments.

And, the number of subframes to use in uplink transmission and downlink transmission depends on the TDD uplink/downlink structural values. When the number of downlink subframes is greater than the number of uplink subframes, a plurality of downlink transmission feedback signals need to be reported in a corresponding uplink subframe. For example, in order to support HARQ, a user terminal needs to transmit a plurality of ACK/NACK signals corresponding to received PDSCHs in a corresponding uplink subframe.

Figure 7:
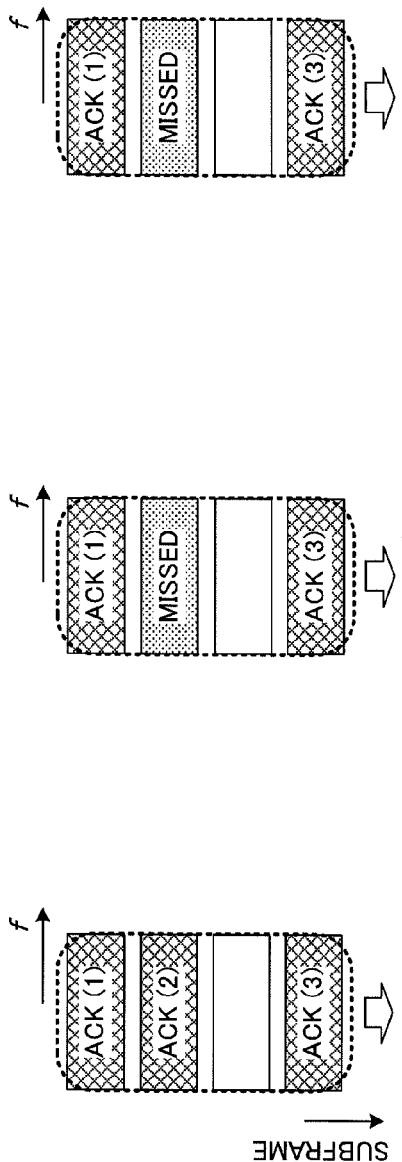
FIG. 7 provides diagrams for explaining addition of a DAI field to the DCI format.

In such a case, in order to reduce the number of bits to transmit in the uplink subframe, there has been adopted ACK/NACK bundling. ACK/NACK bundling is such that HARQ feedback of a plurality of downlink packets is performed by a single ACK/NACK signal. Specifically, when all downlink subframes as one group corresponding to the uplink subframe to transmit an ACK/NACK signal show ACK, ACK is transmitted (see FIG. 7A). On the other hand, when at least one of downlink subframes of one group shows NACK, NACK is transmitted and a request is made to retransmit PDSCHs for the downlink subframes of one group.

By the way, when having not been able to receive a downlink control channel (PDCCH) signal, the user terminal cannot detect the PDSCH signal transmitted to the user terminal. In this case, as a feedback signal to transmit on the uplink is generated only with feedback signals for the received PDSCH signals, if there exists a PDSCH received properly, other than the signal in reception error, in the ACK/NACK bundling, the radio base station apparatus is not able to detect the reception error of PDCCH of the user terminal (see FIG. 7B).

In order to solve this problem, in the LTE system, downlink assignment index (DAI) is used in PDCCH scheduling assignment. DAI is such that an accumulate value of PDSCH subframes to receive is reported to a user terminal and the user apparatus sends back an ACK/NACK signal properly (see FIG. 7C).

Information about DAI is arranged in a DAI field added to the DCI format (for example, DCI format 1A) having downlink scheduling assignment when the TDD scheme is employed. In the LTE system, when the TDD scheme is applied, the 2-bit DAI field is included in the DCI format 1A.

However, in this case, only four values can be expressed by the DAI value. If a cumulative value of PDSCH subframes is 4 or more, the one DAI value has to represent plural cumulative values of PDSCH (see FIG. 7D). Therefore, when the number of downlink subframes is greater than the number of uplink subframes, it becomes difficult to properly specify an ACK/NACK signal reported from the user terminal.

Then, in the present embodiment, information indicative of a cumulative value of downlink shared channel transmission is added to the information field added to the second DCI format. For example, 2 bits (4 values) of the existing DAI field included in the DCI format 1A and an information field added (1 bit or 2 bits) are added together to extend the information field (3 bits (8 values) or 4 bits (16 values)), which is used in reporting of the DAI value.

With this structure, in radio communication to which the TDD scheme is applied, it is possible to properly specify an ACK/NACK signal reported from a user terminal when ACK/NACK bundling is applied and the number of downlink subframes is greater than the number of uplink subframes.

Here, when the information field of 2 bits or more is added to the second DCI format, the DAI field may be extended by using an 1-bit information field and this added information field may be used to add other downlink control information.

<Extension of ARI Field>

Next description is made about the case where identification information to designate a radio resource for a retransmission response signal is added to an information field added to the second DCI format having downlink scheduling assignment.

In the LTE-A system, there has been studied a PUCCH format (PUCCH format 3) used when transmitting feedback control information for PDSCH signals transmitted in plural downlink CCs. Note that the PUCCH format 3 is, like PDSCH, characterized by generating by DFT (Discrete Fourier Transform) based precoding and multiplexing different UE apparatuses by OCC. The radio resource for a retransmission response signal in this PUCCH format 3 can be obtained by the user terminal using a field for ARI (ACK/NACK Resource Indicator) provided in the downlink control channel (PDCCH). Here, ARI is identification information to designate a radio resource for a retransmission response signal.

Figure 8:
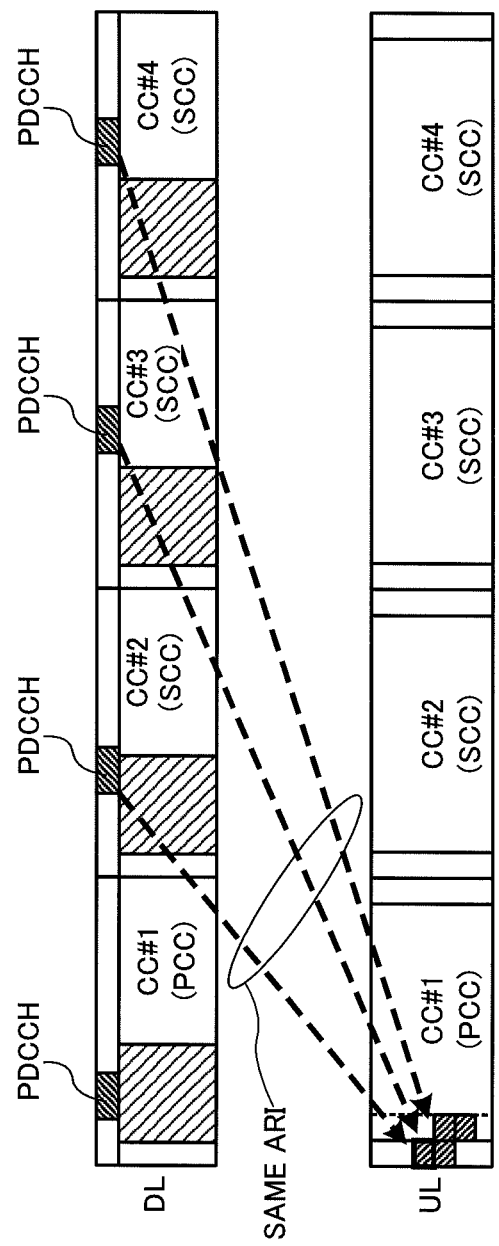
FIG. 8 is a schematic diagram for explaining radio resources for a retransmission response signal in the LTE-A system.

A method of assigning a radio resource for a retransmission response signal in the LTE-A system will be described with reference to FIG. 8. In FIG. 8, a transmission band is formed with four CCs (CC#1 to CC#4). Besides, in FIG. 8, CC#1 constitutes a first fundamental frequency block (PCC) of a user terminal to transmit and CC#2 to CC#4 constitute second fundamental frequency blocks (SCCs: Secondly Component Carriers).

In the LTE-A system, when assigning a radio resource for a retransmission response signal, first, each user terminal is assigned with a plurality of radio resources (for example, four radio resources) from a higher layer by RRC signaling. And, in the PDCCH for a PDSCH of an SCC, a TPC field (2 bits) is replaced with the ARI field.

In this ARI field, one radio resource to be used by the user terminal is designated out of a plurality of radio resources assigned by RRC signaling. In the user terminal, the radio resource designated by the ARI field is specified from a plurality of radio resources assigned by RRC signaling thereby to be able to obtain the radio resource for a retransmission response signal.

Here, in the ARI field, the same radio resource is designated for the plural SCCs (CC#2 to C#4 in FIG. 8). With this designation, in the user terminal, it is possible to specify only one radio resource assigned to the own apparatus. Retransmission response signals corresponding to all CCs are mapped to the thus specified radio resource, and thereby it is possible to notify the radio base station apparatus that the PDSCHs have been received properly or the PDSCHs have not been received properly.

In the above-described structure, the TPC field (2 bits) in the DCI format 1A of an SCC is used for reporting ARI. Considering that more user terminals share one resource for effective use of radio resources, it is necessary to increase radio resources to assign to each user terminal from a higher layer by RRC signaling.

Here, in another aspect of the present embodiment, 2 bits of this existing ARI field and the information field to add (1 bit or 2 bits) are added together to extend the information field (3 bits or 4 bits), which is used in ARI reporting. For example, the number of resources to assign to each user terminal by RRC signaling is 8 or 16, the information about the ARI is added to the information field added to the DCI format 1A and the ARI field is extended from existing 2 bits (4 values) to 3 bits (8 values) or 4 bits (16 values). With this structure, it is possible to share one resource by more UE apparatuses, thereby improving the use efficiency of radio resources.

Here, when an information field of 2 bits or more is added to the second DCI format, it may be configured that the ARI field is extended by using the 1-bit information field and other downlink control information is added to the other additional information field.

<Extension of TPC Field>

Another aspect of the present embodiment is characterized by adding uplink transmission power control information to an information field added to the second DCI format. Here, the uplink transmission power control information is, for example, information to extend a field for uplink transmission power control command that forms the second DCI format.

In the LTE-A system, there has been studied UL multi antenna transmission by a user terminal equipped with a plurality of antennas. In the DCI format 1A, an existing TPC field (2 bits) is assigned for a PUCCH transmission power control command.

Accordingly, 2 bits of this existing TPC field and the information field to add (1 bit or 2 bits) are added together to extend the information field (3 bits or 4 bits), which can be used in uplink transmission power control.

Figure 9A:
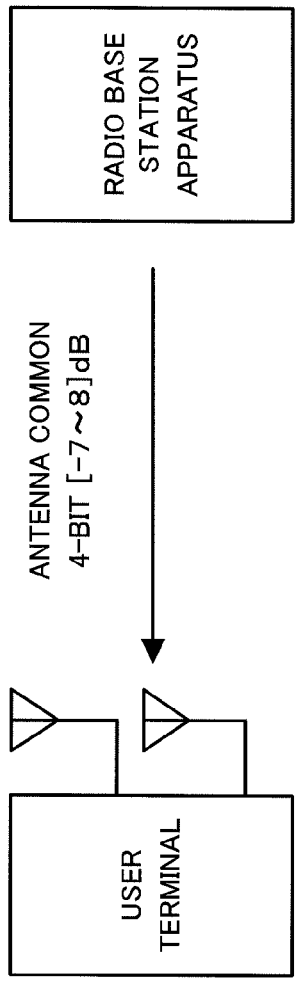
FIG. 9 provides conceptual diagrams illustrating an example of uplink transmission power control.

FIG. 9A is a conceptual diagram illustrating an example of uplink transmission power control. When the information field is added to the second DCI format, the radio base station apparatus generates a 3-bit or 4-bit transmission power control command for a single antenna. The radio base station apparatus sets the generated transmission power control command for a single antenna to 2 bits of the existing TPC field on the DCI format 1A and 2 bits of the added information field. Then, the radio base station apparatus transmits, by signaling, the transmission power control command (3 bits or 4 bits) for a single antenna to a user terminal, using the DCI format 1A having the transmission power control command for a single antenna set therein.

With this structure, it is possible to increase the number of bits assigned to the transmission power control command for a single antenna, thereby being able to realize more flexible and detailed transmission power control.

In the existing TPC field, a transmission power control command for PUCCH expressed by 2-bit data (indicating any one of {−1, 0, 1, 3} dB) is arranged. In this embodiment, as the transmission power control command for a single antenna is extended by 1 bit or 2 bits, the transmission power control command for a single antenna can be given by 3 bits or 4 bits.

For example, when the transmission power control command is extended by 1 bit into a TPC field of 3 bits, it is possible to extend the range of transmission power by 1-dB expression ({−3, −2, −1, 0, 1, 2, 3, 4} dB). When the transmission power control command is extended by 2 bits into a 4-bit TPC field, it is possible to express more wide transmission power range, thereby being able to realize more flexible and detailed transmission power control. Here, description of the transmission power control command is not limited to the above and may be set as appropriate.

Figure 9B:
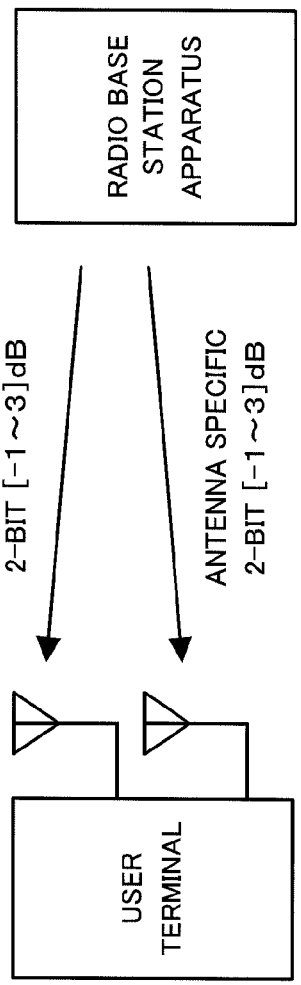

Further, when the transmission power control command is extended by 2 bits into a 4-bit TPC field, the transmission power control command may be configured to be generated for each of plural transmission antennas (see FIG. 9B). In FIG. 9B, when adding an information field to the second DCI format for a user terminal supporting LTE-A, the radio base station apparatus generates an antenna-specific 2-bit transmission power control command for each of antennas (two antennas).

The radio base station apparatus arranges the antenna-specific transmission power control command generated for one of the antennas, in the existing TPC field (2 bits) on the DCI format 1A and arranges the antenna-specific transmission power control command generated for the other antenna in the information field added to the same DCI format 1A. Then, the radio base station apparatus uses the DCI format 1A with the antenna-specific transmission power control commands (2 bits+2 bits) corresponding to the two antennas set therein to send the antenna-specific transmission power control commands to the user terminal by signaling.

With this structure, it is possible to send the antenna-specific transmission power control commands of the two antennas, each by 2 bits. Consequently, it is possible to provide an antenna-specific transmission power control command for each antenna with a resolution ({−1, 0, 1, 3}dB) equivalent to that of the existing transmission power control command for a single antenna (2 bits), thereby being able to make more detailed transmission power control for each antenna.

<Addition of SRS Trigger Field>

Another aspect of the present embodiment is characterized by adding information about a transmission instruction of an aperiodic reference signal to be used in estimation of uplink channel quality, to an information field added to the second DCI format. With this structure, an SRS trigger field is newly provided in the DCI format 1A and a new function (SRS trigger) is added.

As described above, in LTE-A (Rel-10), it has been studied to adopt an aperiodic SRS (hereinafter referred to as "A-SRS") to give a transmission opportunity (trigger) with any timing. Besides, in LTE-A (Rel-10), it has been studied to include an A-SRS trigger field in the DCI format 0/4 having an uplink scheduling grant.

So, in the present embodiment, an information field (1 bit or 2 bits) to be added to the DCI format 1A having downlink scheduling assignment is used for A-SRS triggering.

Figure 10:
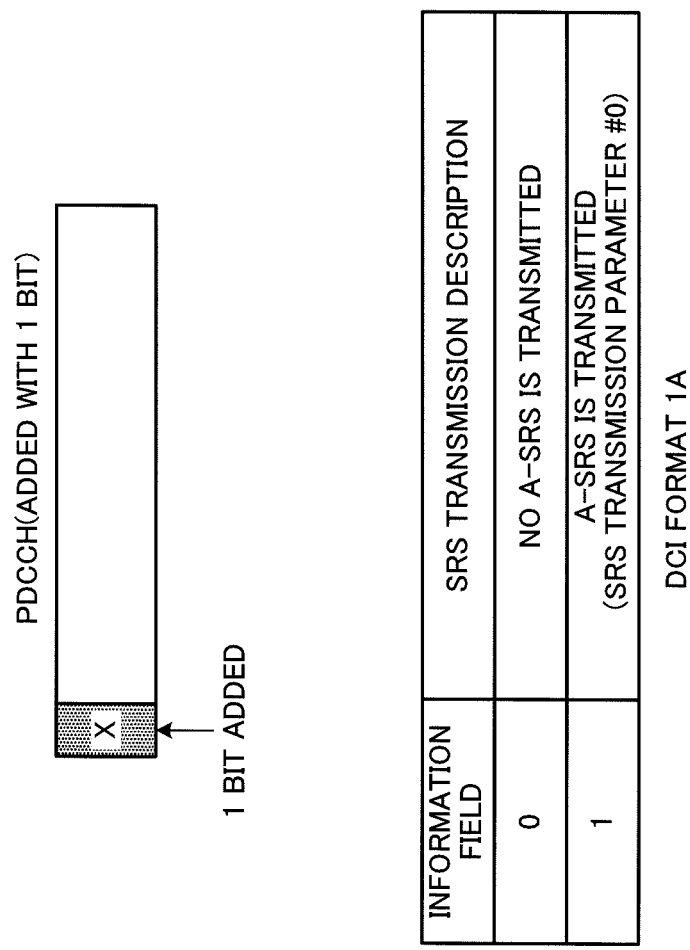
FIG. 10 is a diagram illustrating 1-bit information about presence or absence of SRS trigger that is included in downlink scheduling assignment.

FIG. 10 illustrates the case where when an A-SRS is triggered, a 1-bit A-SRS trigger field is included in the DCI format 1A. In the example illustrated in FIG. 10, when 1-bit data to input to the additional 1-bit field is "0", it means that "no A-SRS is transmitted". When the 1-bit data is "1", it means that "A-SRS is transmitted with an SRS transmission parameter #0". In this way, when the 1-bit A-SRS trigger field is included in the DCI format 1A, it may be treated in the same manner as the A-SRS trigger field included in the DCI format 0 (see FIG. 4B).

The SRS transmission parameter is a parameter to control specific transmission conditions for transmitting an A-SRS, and is defined by Comb, frequency position, cyclic shift number, bandwidth and so on. The SRS transmission parameter #0 may be the same SRS transmission parameter as that of the DCI format 0 or may be defined originally for the DCI format 1A.

FIG. 11 illustrates the case where a 2-bit trigger field is included in the DCI format 1A when A-SRS is triggered. In the example illustrated in FIG. 11A, when the 2-bit data to be input to the additional 2-bit field is "00", it means that "no A-SRS is transmitted", when the 2-bit data is "01", it means that "an A-SRS is transmitted with the SRS transmission parameter #1", when the 2-bit data is "10", it means that "an A-SRS is transmitted with the SRS transmission parameter #2", and when the 2-bit data is "11", it means that "an A-SRS is transmitted with the SRS transmission parameter #3", As illustrated in FIG. 11A, when the 2-bit A-SRS trigger field is included in the DCI format 1A, it may be treated in the same manner as the trigger field included in the DCI format 4. Note that the SRS transmission parameters #1 to #3 may be same SRS transmission parameters as those of the DCI format 4 or may be defined originally for the DCI format 1A.

In the example illustrated in FIG. 11B, the 2-bit A-SRS trigger field is used in triggering an A-SRS and also in designating a CC to transmit the A-SRS. In the example illustrated in FIG. 11B, when the 2-bit data to be input to the additional 2-bit field is "00", it means that "no A-SRS is transmitted", when the 2-bit data is "01", it means that "an A-SRS is transmitted with the SRS transmission parameter #0 via CC#1", when the 2-bit data is "10", it means that "an A-SRS is transmitted with the SRS transmission parameter #0 via CC#2", and when the 2-bit data is "11", it means that "an A-SRS is transmitted with the SRS transmission parameter #0 via CC#3".

In this way, information about A-SRS triggering and information to designate a CC to transmit an A-SRS are subjected to joint coding thereby to be able to make effective use of radio resources. Note that the SRS transmission parameter #0 may be the same SRS transmission parameter as that of the DCI format 0 and may be defined originally for the DCI format 1A.

In the example illustrated in FIG. 11C, the 2-bit A-SRS trigger field is used for A-SRS triggering and also for a transmission power control command for PUSCH to transmit an A-SRS. In the example illustrated in FIG. 11C, when the 2-bit data to be input to the additional 2-bit field is "00", it means that "no A-SRS is transmitted", when the 2-bit data is "01", it means that "an A-SRS is transmitted with the SRS transmission parameter #0 by application of TPC command=−1 dB", when the 2-bit data is "10", it means that "an A-SRS is transmitted with the SRS transmission parameter #0 by application of TPC command=0 dB", and when the 2-bit data is "11", it means that "an A-SRS is transmitted with the SRS transmission parameter #0 by application of TPC command=1 dB". Note that the description of the TPC command applied is not limited to the above and may be determined as appropriate.

In this way as the information about A-SRS triggering and information about a transmission power control command for PUSCH are subjected to joint coding thereby to be able to make effective use of radio resources. Note that the SRS transmission parameter #0 may be the same SRS transmission parameter as that of the DCI format 0 or may be defined originally for the DCI format 1A.

Figure 12:
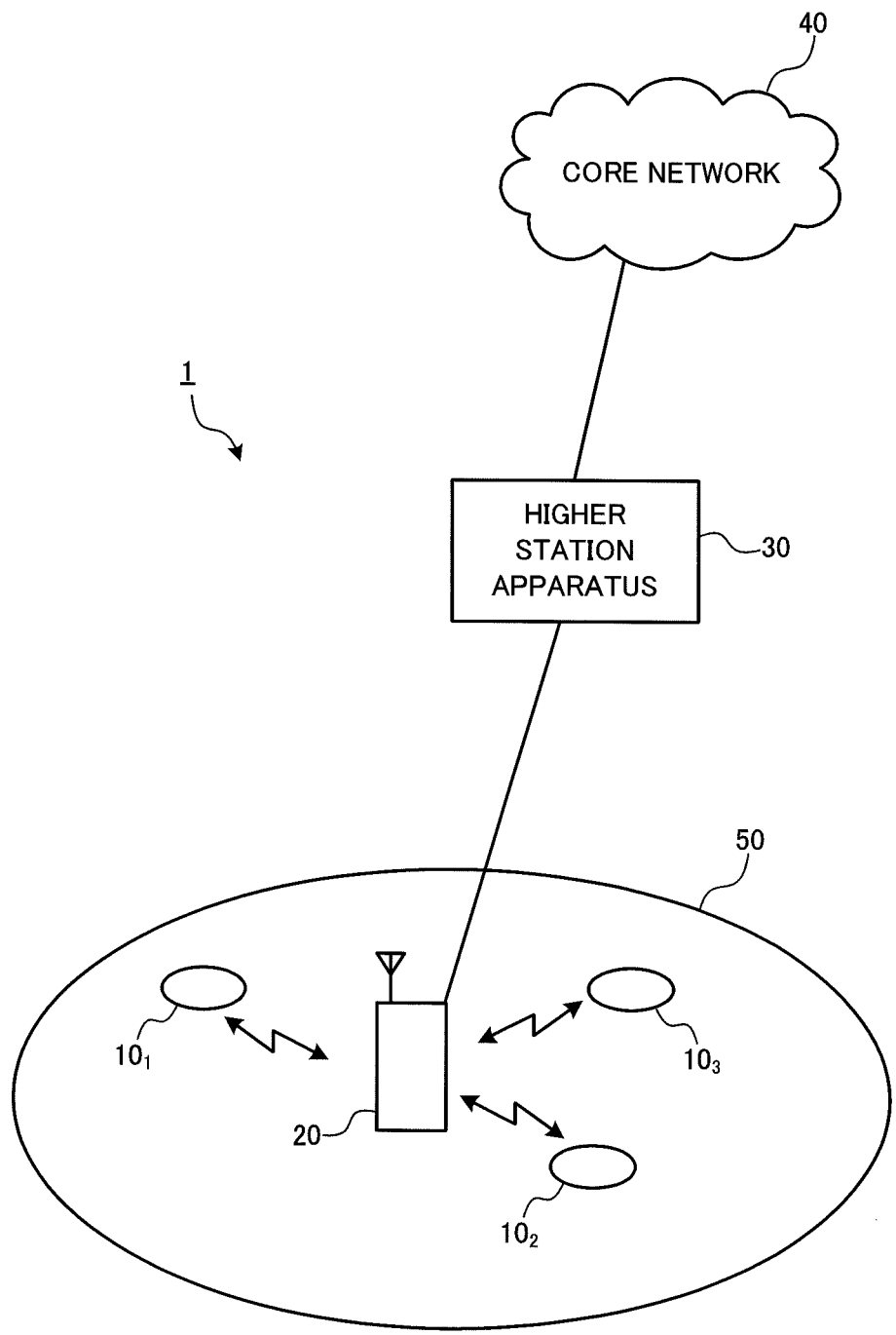
FIG. 12 is a diagram explaining a configuration of a mobile communication system according to an embodiment of the present invention.

Referring to FIG. 12, a mobile communication system 1 having a user terminal 10 and a radio base station apparatus 20 according to an embodiment of the present invention will be described below. The user terminal 10 and the radio base station apparatus 20 support LTE-A.

As illustrated in FIG. 12, the mobile communication system 1 is configured to include a radio base station apparatus 20 and a plurality of user terminals 10 ($10_1$, $10_2$, $10_3$, . . . $10_n$, where n is an integer to satisfy n>0) that communicate with the radio base station apparatus 20. The radio base station apparatus 20 is connected with a higher station apparatus 30, and this higher station apparatus 30 is connected with a core network 40. The user terminals 10 are able to communicate with the radio base station apparatus 20 in a cell 50.

Note that the higher station apparatus 30 includes, for example, an access gateway apparatus, a radio network controller (RNC), a mobility management entity (MME) and so on, but is by no means limited to these. The higher station apparatus 30 may be included in the core network 40.

The user terminals ($10_1$, $10_2$, $10_3$, . . . $10_n$) are LTE-A terminals unless specified otherwise, but may include LTE terminals. For ease of explanation, description is given assuming that the user terminals 10 perform radio communication with the radio base station apparatus 20, however, more generally, the user terminals may be user apparatuses (UE: User Equipment) including mobile terminals and fixed terminals.

In the mobile communication system 1, as radio access schemes, OFDMA (Orthogonal Frequency Division Multiple Access) is applied to the downlink, and SC-FDMA (Single-Carrier Frequency-Division Multiple Access) and clustered DFT-spread OFDM are applied to the uplink.

OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands. Clustered DFT-spread OFDM is a scheme to realize uplink multiple access by allocating groups (clusters) of discontinuous, clustered subcarriers to one mobile station UE and applying discrete Fourier transform spread OFDM to each cluster.

Here, description is made about configurations of the communication channels defined in the LTE-A system. The downlink communication channels include the PDSCH, which is used by each user terminal 10 on a shared basis, and downlink L1/L2 control channels (including the PDCCH, PCFICH and PHICH). This PDSCH is used to transmit user data (including higher layer control signals), that is, normal data signals. The transmission data is included in this user data. Here, fundamental frequency blocks (CCs) assigned to the user terminal 10 by the radio base station apparatus 20 and scheduling information are transmitted to the user terminal 10 in the downlink control channels.

The higher layer control signals include RRC signaling to report the increase/decrease in number of carrier aggregations and the uplink radio access scheme (SC-FDMA/clustered DFT-spread OFDM) to be applied to each component carrier to the user terminal 10. Also, when a start position of a search space is controlled in the user terminal 10 based on information transmitted from the radio base station apparatus 20, information (for example, the constant K and so on) about a control expression to determine the start position of a search space may be configured to be transmitted to the user terminal 10 by RRC signaling. Then, a fundamental frequency block-specific offset $n_{cc}$ may be configured to be transmitted simultaneously by RRC signaling.

The uplink communication channels include PUSCH, which is used by each user terminal 10 on a shared basis, and the PUCCH, which is an uplink control channel. This PUSCH is used to transmit user data. The PUCCH is used to transmit downlink CSI (CQI/PMI/RI), ACK/NACK and so on, and, in SC-FDMA, intra-subframe frequency hopping is applied.

Figure 13:
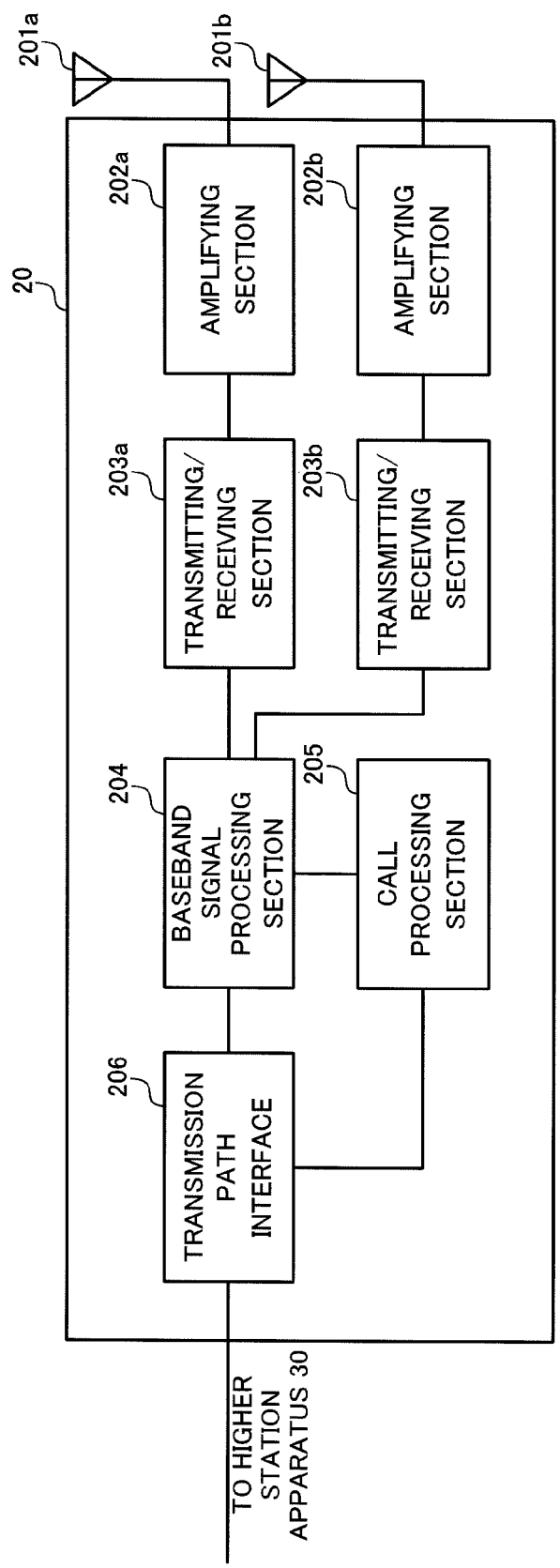
FIG. 13 is a functional block diagram illustrating an overall configuration of a radio base station apparatus according to the embodiment of the present invention.

With reference to FIG. 13, description is made about an overall configuration of the radio base station apparatus 20 according to the present embodiment. The radio base station apparatus 20 has transmitting/receiving antennas 201a and 201b, amplifying sections 202a and 202b, transmitting/receiving sections 203a and 203b, a baseband signal processing section 204, a call processing section 205, and a transmission path interface 206. The sections of the radio base station apparatus 20 may be implemented by hardware, software, or a combination thereof.

User data to be transmitted from the radio base station apparatus 20 to the user terminal 10 on the downlink is input from the higher station apparatus of the radio base station apparatus 20 into the baseband signal processing section 204, via the transmission path interface 206.

In the baseband signal processing section 204, PDCP layer processing such as addition of a sequence number, division and coupling of user data, RLC (Radio Link Control) layer transmission processing such as RLC retransmission control transmission processing, MAC (Medium Access Control) retransmission control, including, for example, HARQ (Hybrid Automatic Repeat request) transmission processing, scheduling, transport format selection, channel coding, inverse fast Fourier transform (IFFT) processing, and precoding processing, are performed.

Also, the baseband signal processing section 204 notifies the user terminal 10 of control information for allowing the user terminal 10 to perform radio communication in the cell 50, by a broadcast channel. Broadcast information for communication in the cell 50 includes, for example, the uplink or downlink system bandwidth, identification information of a root sequence (root sequence index) for generating random access preamble signals in the PRACH, and so on.

In the transmitting/receiving section 203a and 203b, the baseband signal output from the baseband signal processing section 204 is subjected to frequency conversion into a radio frequency band. RF signals are amplified in the amplifying sections 202 and output to the transmitting/receiving antennas 201a and 201b.

The radio base station apparatus 20 receives transmission wave transmitted from the user terminal 10, by the transmitting/receiving antennas 201a and 201b. Radio frequency signals that are received in the transmitting/receiving antennas 201a and 201b are amplified in the amplifying sections 202a and 202b, subjected to frequency conversion and converted into baseband signals in the transmitting/receiving section 203a and 203b, and are input to the baseband signal processing section 204.

The baseband signal processing section 204 performs FFT processing, IDFT processing, error correction decoding, MAC retransmission control reception processing, and RLC layer and PDCP layer reception processing on the user data included in the baseband signal that is received on the uplink. The decoded signal is transferred to the higher station apparatus 30 through the transmission path interface 206.

The call processing section 205 performs call processing such as setting up and releasing of a communication channel, manages the state of the radio base station apparatus 20 and manages the radio resources.

Figure 14:
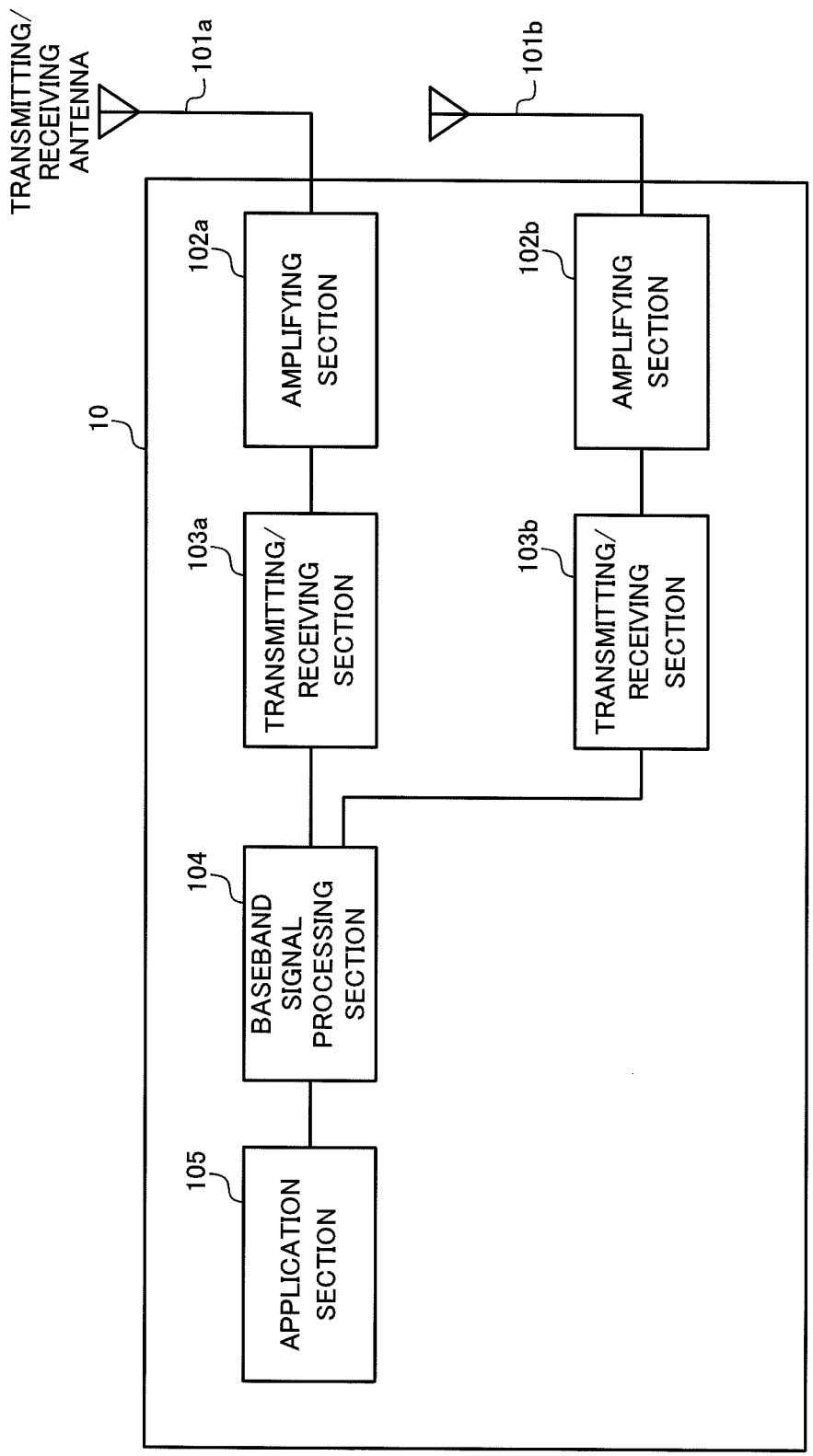
FIG. 14 is a functional block diagram illustrating an overall configuration of a user terminal according to the embodiment of the present invention.

Next description is made, referring to FIG. 14, about an overall configuration of the user terminal 10 according to the present embodiment. The user terminal 10 has a plurality of transmitting/receiving antennas 101a and 101 b, amplifying sections 102a and 102b, transmitting/receiving sections 103a and 103b, a baseband signal processing section 104, and an application section 105. The sections of the user terminal 10 may be implemented by hardware, software, or a combination thereof.

Radio frequency signals received in the transmitting/receiving antennas 101a and 101b are amplified in the amplifying sections 102a and 102b, and subjected to frequency conversion and converted into baseband signals in the transmitting/receiving sections 103a and 103b. These baseband signals are subjected to FFT processing, error correction decoding and retransmission control reception processing and so on in the baseband signal processing section 104. In this downlink data, downlink user data is transferred to the application section 105. The application section 105 performs processing related to higher layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, retransmission control (HARQ) transmission processing, channel coding, DFT processing and IFFT processing are performed. The baseband signals output from the baseband signal processing section 104 are converted into a radio frequency band in the transmitting/receiving sections 103a and 103b, and, after that, amplified in the amplifying sections 102a and 102b and transmitted from the transmitting/receiving antennas 101a and 101b.

Figure 15:
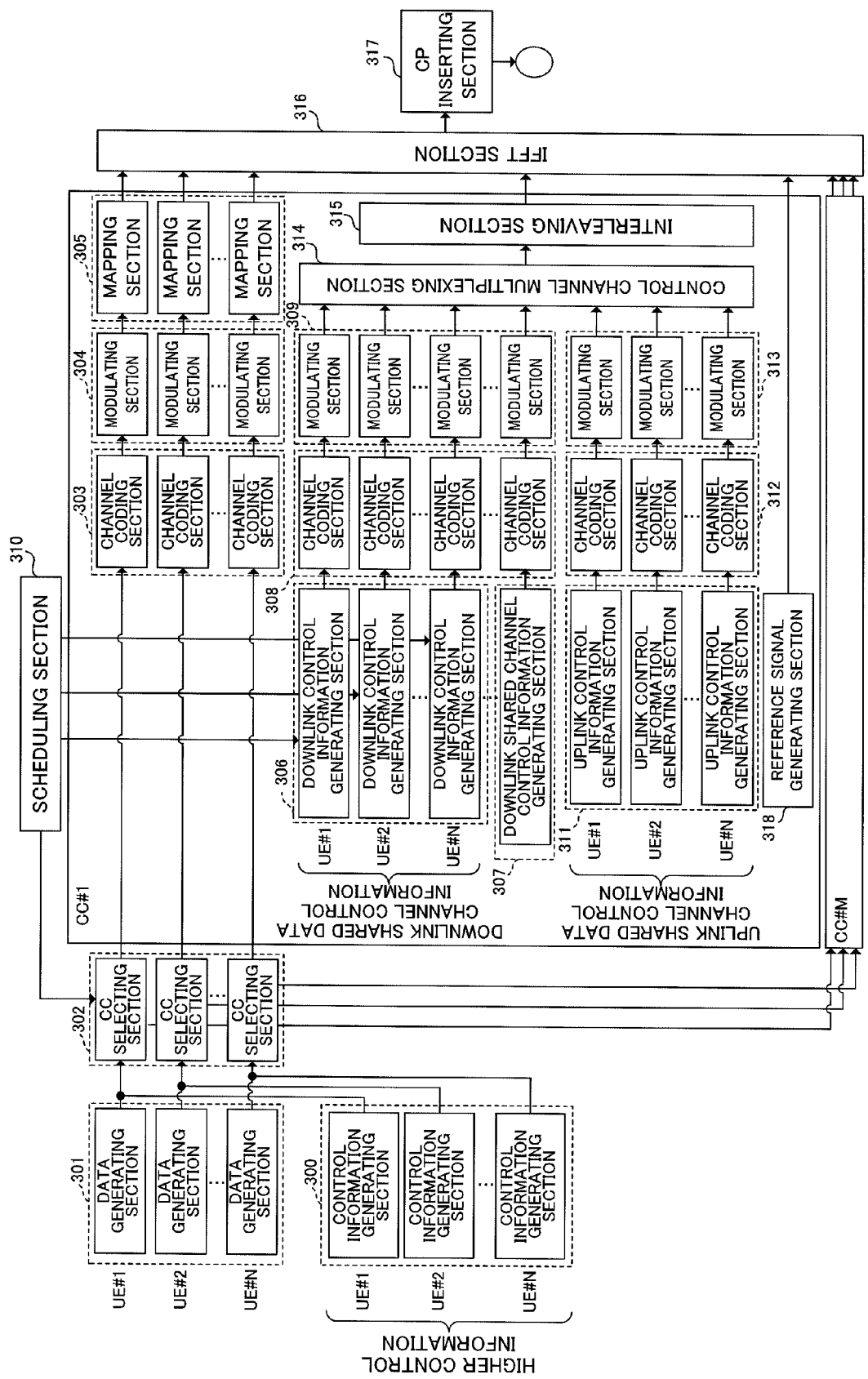
FIG. 15 is a functional block diagram illustrating a part of higher layers and a baseband processing section of the radio base station apparatus according to the embodiment of the present invention.

FIG. 15 is a functional block diagram of a part of the higher layer and the baseband signal processing section 204 provided in the radio base station apparatus 20 according to the present embodiment, and primarily illustrates the functional blocks of the transmission processing section in the baseband signal processing section 204. FIG. 15 illustrates an example of a base station configuration which can support maximum M (CC #1 to CC #M) component carriers. Transmission data for the user terminal 10 under the radio base station apparatus 20 is transferred from the higher station apparatus 30 to the radio base station apparatus 20.

A control information generating section 300 generates higher control signals for performing higher layer signaling (RRC signaling), on a per-user basis. The higher control signals may include a command to request addition/removal of component carriers CC.

A data generating section 301 outputs the transmission data transferred from the higher station apparatus 30 separately as user data.

A component carrier selecting section 302 selects component carriers to use in radio communication with the user terminal 10 on a per-user basis. As described above, addition/removal of component carriers is reported from the radio base station apparatus 20 to the user terminal 10 by RRC signaling, and an application complete message is received from the user terminal 10. As this application complete message is received, assignment (addition/removal) of component carriers to the user is fixed, and the fixed component carrier assignment is set in the component carrier selecting section 302 as component carrier assignment information. In accordance with the component carrier assignment information that is set in the component carrier selecting section 302 on a per-user basis, higher control signals and transmission data are allocated to a channel coding section 303 of an applicable component carrier.

A scheduling section 310 controls assignment of component carriers to a serving user terminal 10 according to overall communication quality of the system band. The scheduling section 310 determines addition/removal of component carriers to assign to communication with the user terminal 10. A decision result related to addition/removal of component carriers is reported to a control information generating section 300. Also, a primary component carrier (PCC) is determined from component carriers selected on a per-user basis. The PCC may be switched dynamically or may be switched semi-statically.

Also, the scheduling section 310 controls resource allocation in each of component carriers. The LTE terminal user and the LTE-A terminal user are scheduled separately. Also, the scheduling section 310 receives as input the transmission data and retransmission command from the higher station apparatus 30, and also receives as input the channel estimation values and resource block CQIs from the receiving section having measured uplink received signals.

The scheduling section 310 schedules downlink assignment information, uplink assignment information and uplink/downlink shared channel signals, with reference to the retransmission command, channel estimation values and CQIs that are received as input from the higher station apparatus 30. A propagation path in mobile communication varies differently per frequency, due to frequency selective fading. So, upon transmission of user data, resource blocks of good communication quality are assigned to each user terminal 10, on a per-subframe basis (which is referred to as "adaptive frequency scheduling"). In adaptive frequency scheduling, for each resource block, a user terminal 10 of good propagation path quality is selected and assigned. Consequently, the scheduling section 310 assigns resource blocks, with which improvement of throughput is anticipated, using the CQI of each resource block, fed back from each user terminal 10.

Also, the scheduling section 310 controls the number of CCE aggregations according to the propagation path conditions with the user terminal 10. The number of CCE aggregations is increased with respect to cell edge users. Also, the MCS (Coding rate and Modulation Scheme) to fulfill a required block error rate with the assigned resource blocks is determined. Parameters to fulfill the MCS (Coding rate and Modulation Scheme) determined by the scheduling section 310 are set in channel coding sections 303, 308 and 312, and in modulating sections 304, 309 and 313.

The baseband signal processing section 204 has channel coding sections 303, modulating sections 304, and mapping sections 305, to match the maximum number of users to be multiplexed, N, in one component carrier. The channel coding section 303 performs channel coding of the shared data channel (PDSCH), formed with user data (including part of higher control signals) that is output from the data generating section 301, on a per-user basis. The modulating section 304 modulates user data having been subjected to channel coding, on a per-user basis. The mapping section 305 maps the modulated user data to radio resources.

Also, the baseband signal processing section 204 has a control information generating section that generates control information using a predetermined DCI format out of a plurality of DCI formats. The plural DCI formats include a first DCI format (for example, DCI format 0) containing an uplink scheduling grant and a second DCI format (for example, DCI format 1A) containing downlink scheduling assignment.

The DCI format containing downlink scheduling assignment is used by a downlink control information generating section 306 for generating downlink shared data channel control information that is user-specific downlink control information. And, the DCT format containing an uplink scheduling grant is used by an uplink control information generating section 311 for generating uplink shared data channel control information to control uplink shared data channels (PUSCH) on a per-user basis).

When the first DCI format (for example, DCI format 0) is extended in size in accordance with the change in communication environment, the control information generating section (downlink control information generating section 306) adds an information field to the second DCI format (for example, DCI format 1A) so as to have the same size as the extended first DCI format, and also adds information to extend existing functions of the second DCI format and/or information to add new functions to the information field thereby to generate control information.

For example, the downlink control information generating section 306 adds information indicative of a cumulative value of downlink shared channel transmission to the information field added to the second DCI format thereby to extend the existing DAI field included in the second DCI format. And, the downlink control information generating section 306 adds identification information to identify a radio resource for a retransmission response signal to the information field added to the second DCI format thereby to extend the existing ARI field included in the second DCI format. And, the downlink control information generating section 306 adds uplink transmission power control information to the information field added to the second DCI format thereby to extend the existing uplink transmission power control command field included in the second DCI format.

Besides, the downlink control information generating section 306 adds a new function to the second DCI format by adding information about triggering of an aperiodic reference signal for uplink channel quality measurement to the information field added to the second DCI format. Alternatively, the downlink control information generating section 306 performs joint coding on information about triggering of an aperiodic reference signal for uplink channel quality measurement and information about a fundamental frequency block to transmit the A-SRS and adds the resultant to the information field added to the second DCI format thereby to add a new function to the second DCI format. Alternatively, the downlink control information generating section 306 performs joint coding on information about triggering of an aperiodic reference signal for uplink channel quality measurement and information about a fundamental frequency block to transmit the A-SRS and adds the resultant to the information field added to the second DCI format thereby to add a new function to the second DCI format.

Also, the baseband signal processing section 204 has a downlink shared channel control information generating section 307 for generating downlink shared control channel control information, which is user-common downlink control information.

The baseband signal processing section 204 has channel coding sections 308 and modulating sections 309 to match the maximum number of users to be multiplexed, N, in one component carrier. The channel coding section 308 performs channel coding of control information generated in the downlink control information generating section 306 and the downlink shared channel control information generating section 307, on a per-user basis. The modulating section 309 modulates the downlink control information after channel coding.

Also, the baseband signal processing section 204 has a channel coding section 312 that performs, on a per-user basis, channel coding of uplink shared data channel control information generated, and a modulating section 313 that modulates, on a per-user basis, uplink shared data channel control information having been subjected to channel coding.

The uplink data channel control information is uplink control information transmitted to the user terminal via the DCI format 0/4. An uplink control information generating section 311 generates uplink control information from RA flag, assignment information indicating the number of resource blocks and position of the resource block determined per user terminal, modulation scheme, coding rate and redundancy version, identifier to identify whether data is new data or reproduced data, PUSCH transmission power control command, demodulation reference signal cyclic shift (CS for DMRS), CQI request, A-SRSF, PMI/RI and so on.

A reference signal generating section 318 multiplexes cell-specific reference signals (CRSs) used for various purposes of mobility measurement, CQI measurement, symbol synchronization and channel estimation in a resource block (RB) by FDM/TDM and transmits the resultant signal. And, the reference signal generating section 318 transmits downlink demodulation reference signal (UE specific RS).

The downlink/uplink control information that is modulated on a per-user basis in the above modulating sections 309 and 313 is multiplexed in a control channel multiplexing section 314 and furthermore interleaved in an interleaving section 315. A control signal that is output from the interleaving section 315 and user data that is output from the mapping section 305 are input in an IFFT section 316 as downlink channel signals. Also, the downlink reference signal is input to the IFFT section 316. The IFFT section 316 converts the downlink channel signal and downlink reference signal from frequency domain signals into time sequence signals by performing inverse fast Fourier transform. A cyclic prefix insertion section 317 inserts cyclic prefixes in the time sequence signals of the downlink channel signals. Note that a cyclic prefix functions as a guard interval for cancelling differences in multipath propagation delay. The transmission data to which cyclic prefixes are added is transmitted to the transmitting/receiving section 203.

Figure 16:
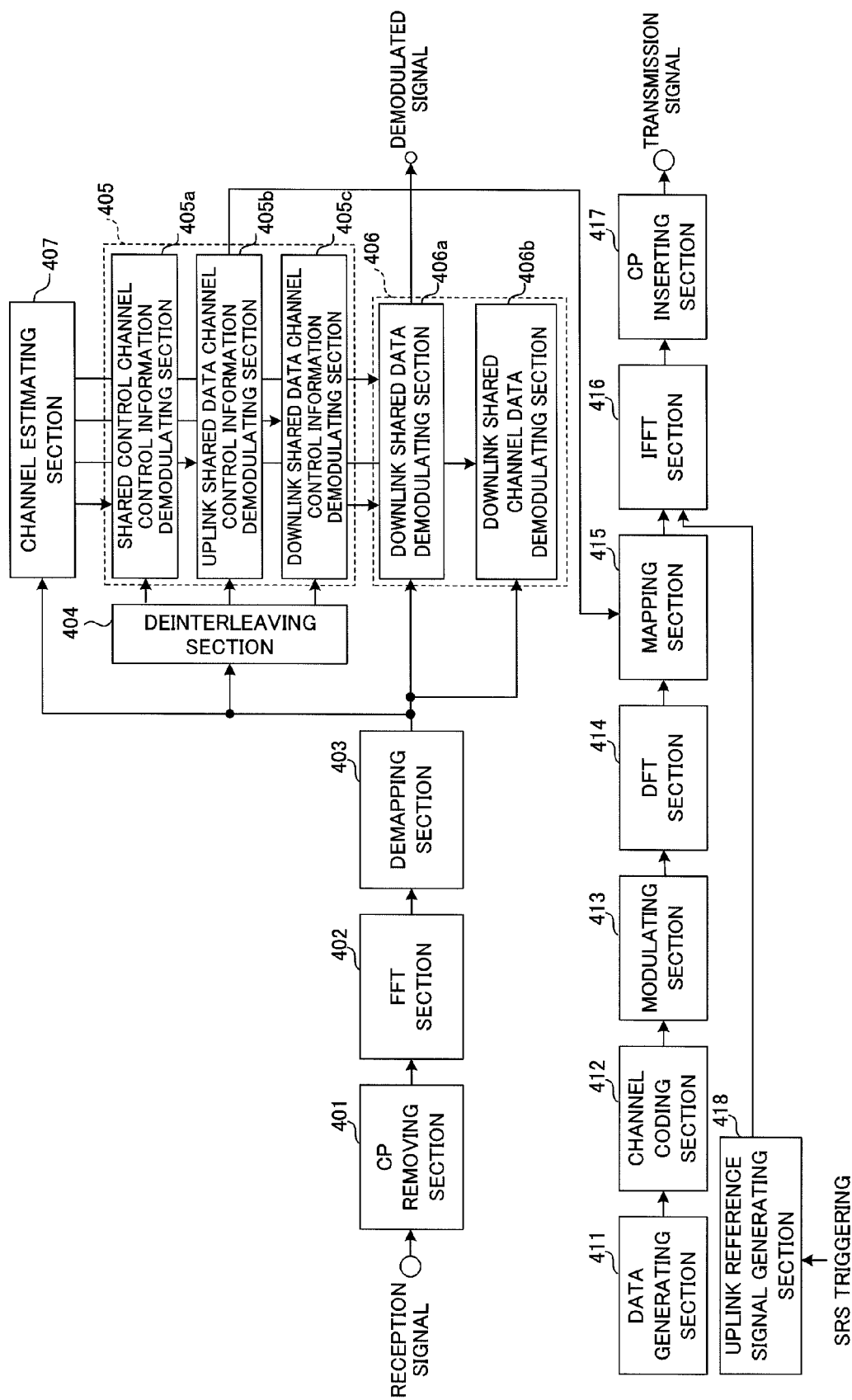
FIG. 16 is a functional block diagram of a baseband processing section of the user terminal according to the embodiment of the present invention.

FIG. 16 is a functional block diagram of the baseband signal processing section 104 provided in the user terminal 10, illustrating functional blocks of an LTE-A terminal which supports LTE-A. First, the downlink configuration of the user terminal 10 will be described.

A downlink signal received from the radio base station apparatus 20 as reception data is subjected to removal of CPs at a CP removing section 401. The downlink signal, from which the CPs have been removed, is input into an FFT section 402. The FFT section 402 performs fast Fourier transform (FFT) on the downlink signal, converts the time sequence signal into a frequency domain signal, and inputs the frequency domain signal in a demapping section 403. The demapping section 403 demaps the downlink signal, and extracts, from the downlink signal, multiplex control information in which a plurality of pieces of control information are multiplexed, user data, and higher control signals. Note that the demapping processing by the demapping section 403 is performed based on higher control signals that are received as input from the application section 105. Multiplex control information that is output from the demapping section 403 is deinterleaved in a deinterleaving section 404.

Also, the baseband signal processing section 104 has a control information demodulating section 405 that demodulates downlink/uplink control information, a data demodulating section 406 that demodulates downlink shared data, and a channel estimating section 407.

The control information demodulating section 405 includes a shared control channel control information demodulating section 405a that demodulates downlink shared control channel control information from the channel control information demodulating section 405b that demodulates uplink shared data channel control information by performing blind decoding of the search space from the downlink control channel, and a downlink shared data channel control information demodulating section 405c that demodulates downlink shared data channel control information by performing blind decoding of the search space from the downlink control channel.

The data demodulating section 406 includes a downlink shared data demodulating section 406a that demodulates the user data and higher control signals, and a downlink shared channel data demodulating section 406b that demodulates downlink shared channel data.

The shared control channel control information demodulating section 405a extracts shared control channel control information, which is user-common control information, by the blind decoding process, demodulation process, channel decoding process and so on of the common search space of the downlink control channel (PDCCH). The shared control channel control information (CQI), and therefore is input in a mapping section 415, and mapped as part of transmission data for the radio base station apparatus 20.

The uplink shared data channel control information demodulating section 405b extracts user-specific uplink control information, by the blind decoding process, demodulation process, channel decoding process and so on, of the user-specific search spaces of the downlink control channel (PDCCH).

The downlink shared data channel control information demodulating section 405c extracts downlink shared data channel control information, which is user-specific downlink control signals, by the blind decoding process, demodulation process, channel decoding process and so on, of the user-specific search spaces of the downlink control channel (PDCCH). The demodulated downlink shared data channel control information is input to the downlink shared data demodulating section 406a and is used to control the downlink shared data channel (PDSCH).

Also, the downlink shared data channel control information demodulating section 405c detects, by one blind decoding, the first DCI format having an uplink scheduling grant extended in size in accordance with the change in communication environment and the second DCI format containing downlink scheduling assignment added with the information field so as to have the same size as the extended first DCI format.

The downlink shared data demodulating section 406a acquires the user data and higher control information based on the downlink shared data channel control information received as input from the downlink shared data channel control information demodulating section 405c. The higher control information (including mode information) is output to the channel estimating section 407. The downlink shared channel data demodulating section 406b demodulates downlink shared channel data based on the uplink shared data channel control information that is input from the uplink shared data channel control information demodulating section 405b.

The channel estimating section 407 performs channel estimation using common reference signals or user terminal-specific reference signals. The estimated channel variation is output to the shared control channel control information demodulating section 405a, the uplink shared data channel control information demodulating section 405b, the downlink shared data channel control information demodulating section 405c and the downlink shared data demodulating section 406a. These demodulating sections demodulate downlink allocation information using the estimated channel variation and demodulation reference signals.

The baseband signal processing section 104 has, as functional blocks of the transmission processing system, a data generating section 411, a channel coding section 412, a modulating section 413, a DFT section 414, a mapping section 415, an IFFT section 416, and a CP inserting section 417. The data generating section 411 generates transmission data from bit data that is received as input from the application section 105. The channel coding section 412 applies channel coding processing such as error correction to the transmission data, and the modulating section 413 modulates the transmission data subjected to channel coding by QPSK and so on. The DFT section 414 performs discrete Fourier transform on the modulated transmission data. The mapping section 415 maps the frequency components of the data symbols after the DFT, to the subcarrier positions designated by the radio base station apparatus 20. The IFFT section 416 performs inverse fast Fourier transform on input data to match the system band and converts the input data into time sequence data, and the CP inserting section 417 inserts cyclic prefixes in the time sequence data per data segment.

The uplink reference signal generating section 418 generates a CSI-RS used only for measurement of CSI (CQI, PMI, Rank number). The CSI-RS is multiplexed in the shared data channel (PUSCH) and transmitted. And, the uplink reference signal generating section 418 generates DMRS used for channel estimation to demodulate PUSCH and PUCCH. The DMRS is orthogonalized with the cyclic shifts and OCCs in combination as described above and multiplexed to RBs to transmit PUSCH and PUCCH and transmitted.

And, the uplink reference signal generating section 418 periodically transmits SRSs used in measurement of reception SINR for application of frequency area scheduling. SRSs are transmitted independently from PUSCH, PUCCH, periodically and over all the band. When the DCI format including an A-SRS trigger field is used to trigger an A-SRS, the uplink reference signal generating section 418 transmits the A-SRS after a lapse of a predetermined period from a subframe where SRS is triggered.

The embodiments disclosed here are provided for illustrative purposes only in all points and are by no means limiting. The scope of the present invention is defined by the claims, not by the above-mentioned embodiments only, and is intended to cover all modifications within the range and meaning equivalent to the claims.

The disclosure of Japanese Patent Application No. 2011-002486, filed on Jan. 7, 2011, including the specification, drawings, and abstract, is incorporated herein by reference in its entirety.

The invention claimed is:

1. A radio base station apparatus comprising:
a processor configured to generate control information by using a predetermined DCI format out of a plurality of DCI formats including a first DCI format having an uplink scheduling grant and a second DCI format having downlink scheduling assignment; and
a transmitter configured to report the control information to a user terminal via a downlink control channel,
wherein the processor is further configured to control triggering of an aperiodic reference signal for uplink channel quality measurement by using at least one of DCI format 0 and DCI format 4 included in the first DCI format and DCI format 1a included in the second DCI format, and
wherein, when information about triggering of the aperiodic reference signal for uplink channel quality measurement is additionally included in the DCI format 0, the processor configures the DCI format 1a to include an extension field to add the information about triggering, the DCI format 0 and the DCI format 1a are configured to be equal in size to each other, and a transmission parameter of an aperiodic reference signal triggered by a trigger field included in the DCI format 0, a transmission parameter of an aperiodic reference signal triggered by a trigger field included in the DCI format 1a, and a transmission parameter of an aperiodic reference signal triggered by a trigger field included in the DCI format 4 are configured individually.

2. The radio base station apparatus of claim 1, wherein the processor performs joint coding of the information about triggering of the aperiodic reference signal for uplink channel quality measurement and information about a fundamental frequency block to transmit an A-SRS and adds a resultant to the extension field.

3. The radio base station apparatus of claim 1, wherein the processor performs joint coding of the information about triggering of the aperiodic reference signal for uplink channel quality measurement and transmission power control information for an uplink shared channel and adds a resultant to the extension field.

4. A radio communication method for transmitting, from a radio base station apparatus to a user terminal, control information generated using a predetermined DCI format selected from a plurality of DCI formats including a first DCI format having an uplink scheduling grant and a second DCI format having downlink scheduling assignment, the radio communication method comprising the steps of:
controlling, by the radio base station apparatus, triggering of an aperiodic reference signal for uplink channel quality measurement by using at least one of DCI format 0 and DCI format 4 included in the first DCI format and DCI format 1a included in the second DCI format,
when information about triggering of the aperiodic reference signal for uplink channel quality measurement is additionally included in the DCI format 0, configuring, by the radio base station apparatus, the DCI format 1a to include an extension field to add the information about triggering and configuring the DCI format 0 and the DCI format 1a to be equal in size to each other; and individually configuring a transmission parameter of an aperiodic reference signal triggered by a trigger field included in the DCI format 0, a transmission parameter of an aperiodic reference signal triggered by a trigger field included in the DCI format 1a, and a transmission parameter of an aperiodic reference signal triggered by a trigger field included in the DCI format 4.

5. A radio communication system comprising:

a radio base station apparatus configured to generate control information; and a user terminal configured to receive and decode the control information transmitted from the radio base station apparatus, wherein the radio base station apparatus comprises:

a processor configured to generate the control information by using a predetermined DCI format out of a plurality of DCI formats including a first DCI format having an uplink scheduling grant and a second DCI format having downlink scheduling assignment; and a transmitter configured to report the control information to the user terminal via a downlink control channel, wherein the processor is further configured to control triggering of an aperiodic reference signal for uplink channel quality measurement by using at least one of DCI format 0 and DCI format 4 included in the first DCI format and DCI format 1a included in the second DCI format, when information about triggering of the aperiodic reference signal for uplink channel quality measurement is additionally included in the DCI format 0, the processor configures the DCI format 1a to include an extension field to add the information about triggering, the DCI format 0 and the DCI format 1a are configured to be equal in size to each other, and a transmission parameter of an aperiodic reference signal triggered by a trigger field included in the DCI format 0, a transmission parameter of an aperiodic reference signal triggered by a trigger field included in the DCI format 1a, and a transmission parameter of an aperiodic reference signal triggered by a trigger field include in the DCI format 4 are configured individually.

* * * * *